US010878295B2

(12) United States Patent
Choi

(10) Patent No.: US 10,878,295 B2
(45) Date of Patent: Dec. 29, 2020

(54) METHOD AND APPARATUS FOR RECOGNIZING IMAGE

(71) Applicant: Samsung Electronics Co., Ltd., Suwon-si (KR)

(72) Inventor: Hee Min Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 97 days.

(21) Appl. No.: 16/155,979

(22) Filed: Oct. 10, 2018

(65) Prior Publication Data

US 2019/0188525 A1 Jun. 20, 2019

(30) Foreign Application Priority Data

Dec. 14, 2017 (KR) .......................... 10-2017-0171815

(51) Int. Cl.
*G06K 9/62* (2006.01)
*G06K 9/32* (2006.01)
*G06T 7/60* (2017.01)
*G06N 3/04* (2006.01)

(52) U.S. Cl.
CPC .......... *G06K 9/628* (2013.01); *G06K 9/3233* (2013.01); *G06K 9/6232* (2013.01); *G06K 9/6261* (2013.01); *G06K 9/6274* (2013.01); *G06N 3/04* (2013.01); *G06T 7/60* (2013.01); *G06T 2207/20084* (2013.01)

(58) Field of Classification Search
CPC .... G06K 9/628; G06K 9/6274; G06K 9/6232; G06K 9/6261; G06K 9/3233; G06N 3/04; G06N 3/08; G06N 3/0454; G06T 7/60; G06T 2207/20084
See application file for complete search history.

(56) References Cited

U.S. PATENT DOCUMENTS

| | | |
|---|---|---|
| 7,676,087 B2 | 3/2010 | Dhua et al. |
| 9,514,366 B2 | 12/2016 | Schweid et al. |
| 2002/0159486 A1 | 10/2002 | Takayama |
| 2004/0212843 A1 | 10/2004 | Kodama et al. |
| 2008/0181512 A1 | 7/2008 | Gavin et al. |
| 2010/0232504 A1 | 9/2010 | Feng |
| 2012/0045090 A1* | 2/2012 | Bobbitt .............. G06K 9/00771 382/103 |
| 2016/0307037 A1 | 10/2016 | Stojancic et al. |
| 2016/0344942 A1 | 11/2016 | Julin et al. |
| 2017/0046613 A1 | 2/2017 | Paluri et al. |

(Continued)

OTHER PUBLICATIONS

Girshick, Ross, "Fast R-CNN", *2015 IEEE International Conference on Computer Vision (ICCV)*, Apr. 30, 2015 (pp. 1440-1448).

(Continued)

*Primary Examiner* — Dhaval V Patel
(74) *Attorney, Agent, or Firm* — Sughrue Mion, PLLC

(57) ABSTRACT

An image recognition method using a region-based convolutional neural network (R-CNN) includes generating a feature map from an input image, detecting one or more regions of interest (ROIs) in the feature map, classifying the ROIs into groups based on setting information, performing pooling on the ROIs classified into the groups independently for each of the groups, and performing a regression operation on a result of the pooling and applying an image classifier to a result of the regression operation.

9 Claims, 5 Drawing Sheets

(56) References Cited

U.S. PATENT DOCUMENTS

2017/0124409 A1 5/2017 Choi et al.
2017/0169315 A1 6/2017 Vaca Castano et al.
2019/0102908 A1* 4/2019 Yang .................. G06K 9/00335

OTHER PUBLICATIONS

Ren, Shaoqing, et al. "Faster R-CNN: Towards Real-Time Object Detection with Region Proposal Networks." *Advances in neural information processing systems*, Jun. 4, 2015 (pp. 1-9).

Dai, Jifeng, et al. "R-fcn: Object Detection via Region-based Fully Convolutional Networks." *Advances in neural information processing systems, 30th Conference on Neural Information Processing Systems (NIPS 2016)*, Barcelona, Spain, Jun. 21, 2016 (9 pages in English).

Li, Bo, et al. "Object Detection via Aspect Ratio and Context Aware Region-based Convolutional Networks." Cornell University, arXiv preprint arXiv:1612.00534, Mar. 22, 2017 (pp. 1-14).

\* cited by examiner

METHOD AND APPARATUS FOR RECOGNIZING IMAGE

CROSS-REFERENCE TO RELATED APPLICATIONS

This application claims the benefit under 35 USC § 119(a) of Korean Patent Application No. 10-2017-0171815 filed on Dec. 14, 2017, in the Korean Intellectual Property Office, the entire disclosure of which is incorporated herein by reference for all purposes.

BACKGROUND

1. Field

The following description relates to a method and apparatus for recognizing an image.

2. Description of Related Art

Most region-based convolutional neural networks (R-CNNs) perform pooling without any consideration of an aspect ratio of a region of interest (ROI). It is thus possible to lose aspect ratio information of the ROI due to warping occurring in the ROI, and this may also degrade a recognition rate of an object in a corresponding image.

In addition, currently used R-CNNs may apply a detection network to each of preset proportions divided in an ROI. In such a case, it is possible to reduce a loss of aspect ratio information of the ROI that is caused by warping. However, the increased computational resources needed for the operation may result in an overload.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an image recognition method using a region-based convolutional neural network (R-CNN), the image recognition method including generating a feature map from an input image, detecting one or more regions of interest (ROIs) in the feature map, classifying the one or more ROIs into groups based on setting information of the respective ROIs, performing pooling on the one or more ROIs classified into the groups for each of the groups, and performing a regression operation on a result of the pooling, and applying an image classifier to a result of the regression operation.

The setting information may include an aspect ratio of each of the one or more ROIs.

The classifying may include classifying an ROI of the ROIs into a group having a representative aspect ratio closest to an aspect ratio of the one or more ROI.

The performing of the pooling may include setting divided regions in each of the ROIs classified into the groups, wherein a ratio between a number of divided regions in an ROI of the one or more ROIs in a horizontal direction and a number of divided regions in the ROI of the one or more ROIs in a vertical direction is equal to a representative aspect ratio of a group comprising the ROI.

The performing of the pooling may include setting divided regions in each of the ROIs classified into the groups, wherein a difference between a number of divided region in any two ROI of the one or more ROIs is less than a threshold value.

The setting information may include a ratio between a horizontal length and a vertical length of each of the one or more ROIs.

The detecting of the one or more ROIs may include detecting the one or more ROIs based on performing region proposal.

In another general aspect, there is provided an image recognition apparatus including a processor configured to generate a feature map from an input image, detect one or more regions of interest (ROIs) in the feature map, classify the one or more ROIs into groups based on setting information of the respective ROIs, perform pooling on the one or more ROIs classified into the groups for each of the groups, and perform a regression operation on a result of the pooling, and apply an image classifier to a result of the regression operation.

The setting information may include an aspect ratio of each of the one or more ROIs.

The processor may be configured to classify an ROI of the one or more ROIs into a group having a representative aspect ratio closest to an aspect ratio of the ROI.

The processor may be configured to set divided regions in each of the ROIs classified into the groups, wherein a ratio between a number of divided regions in an ROI of the one or more ROIs in a horizontal direction and a number of divided regions in the ROI of the one or more ROIs in a vertical direction is equal to a representative aspect ratio of a group comprising the ROI.

The processor may be configured to set divided regions in each of the one or more ROIs classified into the groups, wherein a difference between a number of divided region in any two ROI of the one or more ROIs is less than a threshold value.

Other features and aspects will be apparent from the following detailed description, the drawings, and the claims.

Figure 1:
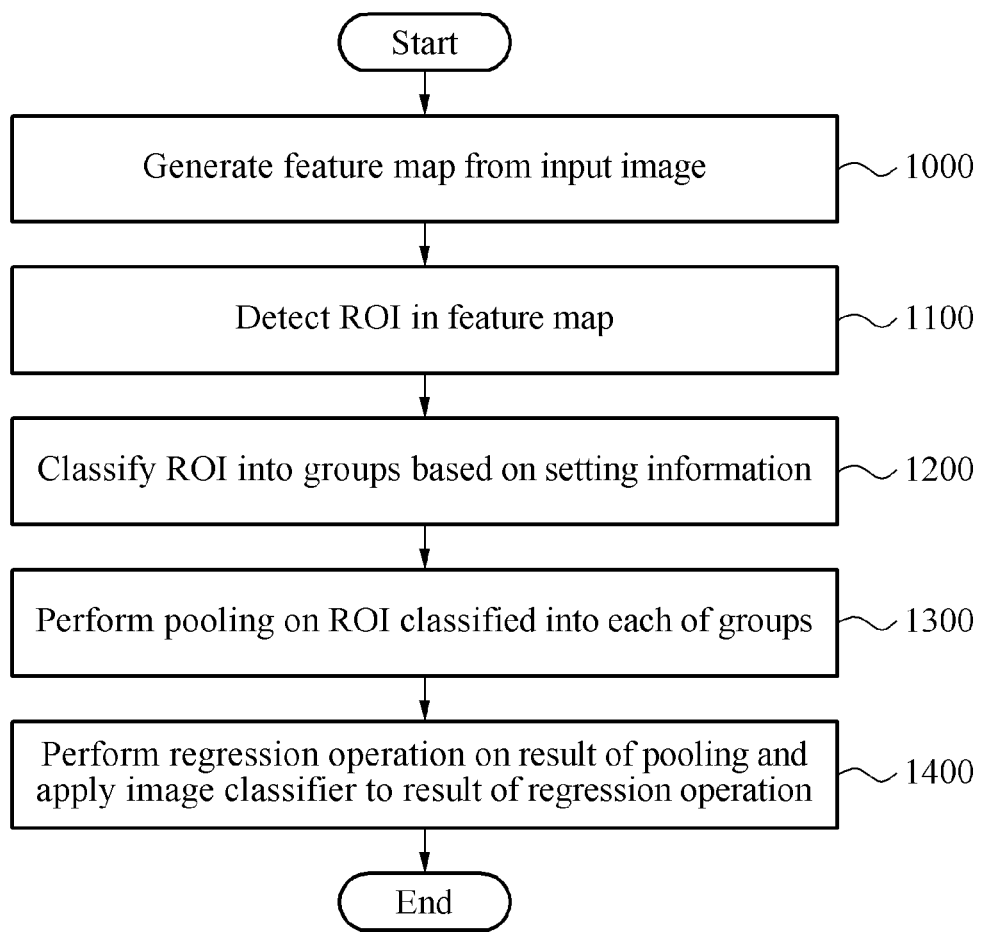
FIG. 1 is a diagram illustrating an example of an image recognition method using a region-based convolutional neural network (R-CNN).

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise.

Also, in the description of embodiments, detailed description of well-known related structures or functions will be omitted when it is deemed that such description will cause redundant description or ambiguous interpretation of the present disclosure.

FIG. 1 is a diagram illustrating an example of an image recognition method using a region-based convolutional neural network (R-CNN). The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer that perform the specified functions, or combinations of special purpose hardware and computer instructions.

Referring to FIG. 1, in operation 1000, an image recognition apparatus 100, which will be described with reference to FIG. 4, generates a feature map from an input image.

Unlike an R-CNN configured to classify a region of interest (ROI) into group and perform pooling, a convolutional neural network (CNN) refers to a multilayer neural network having a specially designed connection structure to perform image processing. Although not illustrated, the CNN may include a plurality of convolution layers and subsampling layers. A convolution layer may generate a feature map by applying various convolution kernels to an input image, and a subsampling layer may reduce a spatial resolution of the generated feature map. The subsampling layer may also reduce a resolution through pooling, for example, max pooling and average pooling.

The R-CNN refers to a CNN used to effectively recognize an object in an image by combining a CNN configured to perform image classification and a region proposal algorithm suggesting a region, for example, an ROI, in which the object is present in the image.

An existing R-CNN may detect an ROI in an input image, and perform pooling on the detected ROI using a CNN. According to an example, the existing R-CNN may detect an ROI and warp the detected ROI, and then perform pooling on the warped ROI using a CNN. In general, a plurality of ROIs may have different aspect ratios. However, such a general R-CNN may ignore a difference in aspect ratio, and set a same number of divided regions, for example, 7*7, to all the ROIs and perform the pooling. In such a case, information loss may occur due to warping.

Another R-CNN may detect an ROI in an input image, and perform pooling on a warped ROI based on various preset ratios. When performing the pooling on each of ROIs based on various ratios, information loss that may be caused by warping may be reduced. However, an overload may occur due to an unnecessary operation.

The image recognition apparatus 100 may generate the feature map associated with the input image using a convolution layer in an R-CNN that may extract a feature from the input image. The convolution layer may include a filter configured to extract the feature, and an activation function configured to convert a value of the filter to a nonlinear value.

A CNN may learn or train a feature extracted from raw data. For example, the CNN may determine an object in an image based on a feature map extracted from a pixel value of the image, such as, for example, a characteristic line, and a color distribution. The generating of the feature map may indicate extracting such a characteristic line or a color distribution.

Figure 2:
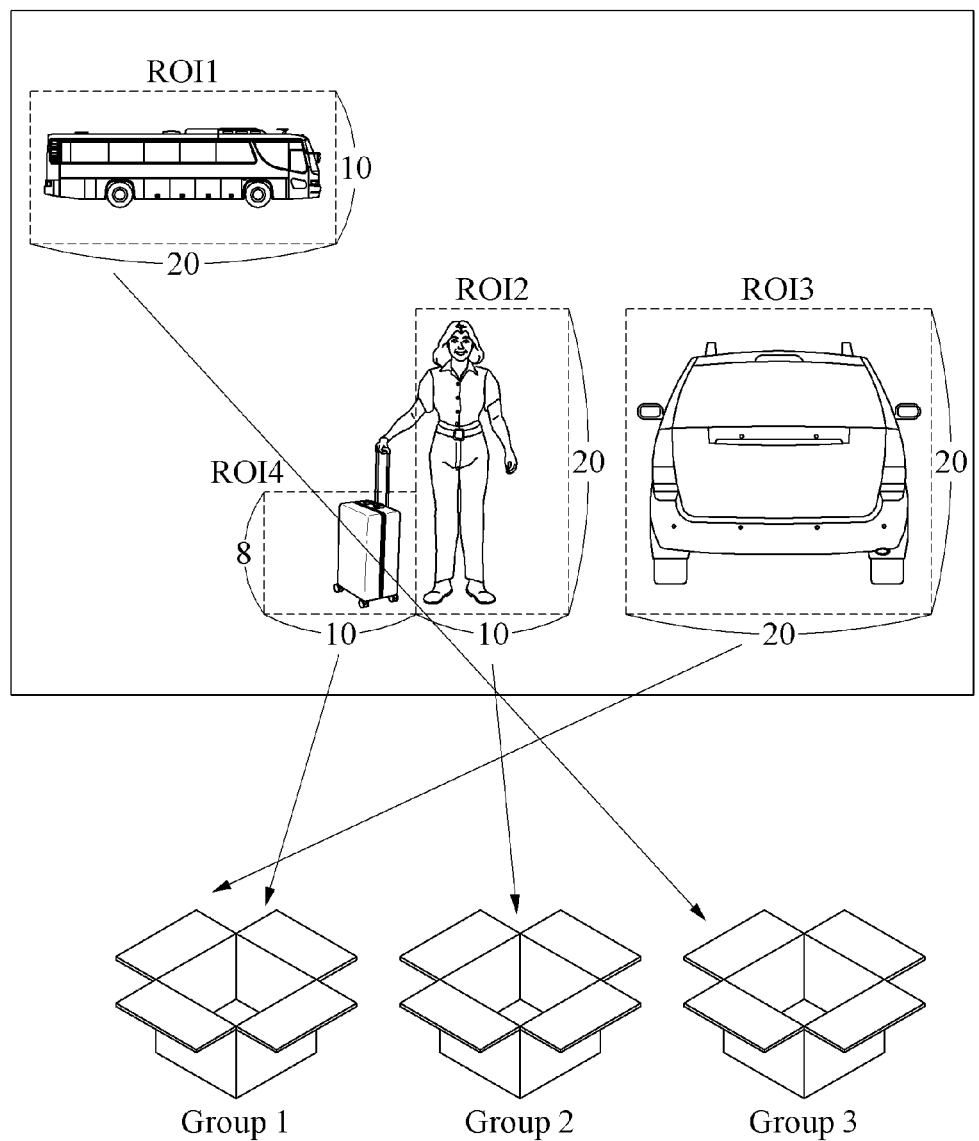
FIG. 2 is a diagram illustrating an example of how one or more regions of interest (ROIs) are classified into group.

FIG. 2 is a diagram illustrating an example of classifying one or more ROIs into group. Referring to FIG. 2, the image recognition apparatus 100 generates a feature map from an input image 10 including various objects, for example, a bus, a human being, a sport utility vehicle (SUV), and a carry-on suitcase.

Referring back to FIG. 1, in operation 1100, the image recognition apparatus 100 detects one or more ROIs in the generated feature map.

An ROI refers to a region in an image on which an operation, for example, pooling or classification, is to be performed. In an example, the image recognition apparatus 100 detects the ROI by performing region proposal. To perform the region proposal, the image recognition apparatus 100 may use a method such as, for example, a region proposal network, a selective search algorithm, and an edge box algorithm. In an example, a bounding box is applied onto an outer boundary of the detected ROI.

Referring to FIG. 2, the input image 10 includes four ROIs. As illustrated in FIG. 2, the image recognition apparatus 100 applies bounding boxes to detected ROIs, for example, ROI1, ROI2, ROI3, and ROI4 as illustrated. In the example illustrated in FIG. 2, numerical values applied to an ROI, for example, 20 and 10 applied to ROI1, indicate a horizontal length (or a width) and a vertical length (or a height) of the ROI. For example, as illustrated, a horizontal length and a vertical length of ROI1 are 20 and 10, respectively, and a horizontal length and a vertical length of ROI2 are 10 and 20, respectively. In addition, a horizontal length and a vertical length of ROI3 are 20 and 20, respectively, and a horizontal length and a vertical length of ROI4 are 10 and 8, respectively.

Referring back to FIG. 1, in operation 1200, the image recognition apparatus 100 classifies the ROIs into group based on setting information.

In an example, the setting information includes an aspect ratio of each of the ROIs, which refers to a ratio between a horizontal length and a vertical length of each of the ROIs. Each of the groups may have a representative aspect ratio that is used to be compared to an aspect ratio of an ROI to classify the ROIs. The image recognition apparatus 100 compares an aspect ratio of each of the ROIs and a representative aspect ratio of each of the groups, and classifies each of the ROIs into a group having a representative aspect ratio corresponding to an aspect ratio of a corresponding ROI. The image recognition apparatus 100 may set the groups to classify the ROIs, and each of the groups have a representative aspect ratio and include one or more of the ROIs.

In an example, the image recognition apparatus 100 may classify an ROI into a group having a representative aspect ratio that is equal to an aspect ratio of the ROI.

FIG. 2 illustrates how ROIs are classified into group. Referring to FIG. 2, to recognize an object included in each of ROIs, the image recognition apparatus 100 uses three groups having representative aspect ratios 1:1, 1:2, and 2:1, respectively. The image recognition apparatus 100 compares an aspect ratio of an ROI in the input image 10 to each of the representative aspect ratios of the groups to classify the ROI into a corresponding group. As illustrated in FIG. 2, the horizontal and vertical lengths of ROI1, ROI2, and ROI3 are (20, 10), (10, 20), and (20, 20), and thus aspect ratios of ROI1, ROI2, and ROI3 are 2:1, 1:2, and 1:1, respectively.

The aspect ratio 2:1 of ROI1 is equal to the representative aspect ratio 2:1 of group 3, and thus the image recognition apparatus 100 classifies ROI1 into group 3. The aspect ratio 1:2 of ROI2 is equal to the representative aspect ratio 1:2 of group 2, and thus the image recognition apparatus 100 classifies ROI2 into group 2. Similarly, the aspect ratio 1:1 of ROI3 is equal to the representative aspect ratio 1:1 of group 1, and thus the image recognition apparatus 100 classifies ROI3 into group 1. In a case of ROI4, there is no group having a representative aspect ratio equal to an aspect ratio of ROI4. In an example, the image recognition apparatus 100 obtains an approximation for such an ROI, and classify the ROI into a corresponding group. The obtaining of an approximation will be described in detail hereinafter.

In an example, the image recognition apparatus 100 classifies an ROI into a group having a representative aspect ratio most closely approximate to an aspect ratio of the ROI. When classifying the ROI into a group having a representative aspect ratio equal to the aspect ratio of the ROI, there may be no group having the representative aspect ratio equal to the aspect ratio of the ROI. In an example, classifying the ROI into a group may not be possible. In an example, many cases may be present where representative aspect ratios are different from an aspect ratio of an ROI. Also, although representative aspect ratios are different from an aspect ratio of an ROI, classifying the ROI may be needed. Thus, the image recognition apparatus 100 may approximate the aspect ratio of the ROI, and classify the ROI into a corresponding group.

Referring to FIG. 2, to classify the ROIs, the image recognition apparatus 100 uses the three groups having representative aspect ratios 1:1, 1:2, and 2:1. As illustrated, an aspect ratio of ROI4 is 1:0.8 because a horizontal length and a vertical length of ROI4 are 10 and 8, respectively, and there is no group having a representative aspect ratio of 1:0.8 among the three groups group 1, group 2, and group 3. Thus, the image recognition apparatus 100 needs to approximate the aspect ratio of ROI4 and classifies ROI4 into a corresponding group.

The image recognition apparatus 100 approximates an aspect ratio of an ROI to a representative aspect ratio of a group that is least different from the aspect ratio of the ROI. In an example, a distance between an aspect ratio of an ROI and a representative aspect ratio of a group may be calculated as follows. An approximation may be obtained by dividing a horizontal length of an ROI for which the approximation is to be obtained, by a vertical length of the ROI (or vice versa). In addition, such a dividing may also be performed for each group.

In the example illustrated in FIG. 2, by dividing the horizontal length 10 of ROI4 by the vertical length 8 of ROI4, 1.25 is obtained. In addition, by dividing a horizontal length by a vertical length for each of the three groups having the respective representative aspect ratios 1:1, 1:2, and 2:1, 1, 0.5, and 2 are obtained, respectively. The image recognition apparatus 100 calculates a distance between such an approximate value 1.25 obtained for ROI4 and each of the values 1, 0.5, and 2 obtained for the other groups. The image recognition apparatus 100 obtains results of the calculating, for example, 0.25(|1.25−1|), 0.75(|1.25−0.5|), and 0.75(|1.25−2|). Based on the results, the image recognition apparatus 100 verifies that a distance from group 1, which is 0.25, is the smallest. Thus, the image recognition apparatus 100 determines that the aspect ratio of ROI4 is closest to the representative aspect ratio 1:1 of group 1, which has the smallest distance, and then classifies ROI4 into group 1.

When obtaining an approximation of an aspect ratio of an ROI, there may be two representative aspect ratios that are closest to the aspect ratio of the ROI. For example, in a case in which the image recognition apparatus 100 uses two groups to classify an ROI, and an aspect ratio of the ROI is 1.25 and the groups have representative aspect ratios 1:1 and 3:2, respectively, an approximation may be calculated as described above. By dividing a horizontal length by a vertical length for each of the two groups, values 1 and 1.5 are obtained for the two groups, respectively. In such an example, a difference 0.25 between the aspect ratio 1.25 and 1, and a difference 0.25 between the aspect ratio 1.25 and 1.5 are equal to each other, and thus there are the two groups having the representative aspect ratios closest to the aspect ratio of the ROI. In this example, the image recognition apparatus 100 may determine which one of the horizontal length and the vertical length of the ROI is longer or shorter than the other, and then classify the ROI into a corresponding group having such a corresponding proportion between a horizontal length and a vertical length of the group. Thus, the image recognition apparatus 100 may classify the ROI into a group having a representative aspect ratio that is closer to the aspect ratio of the ROI.

In the above example, the ROI for which the approximation is to be obtained has the aspect ratio of 1.25, and thus the image recognition apparatus 100 may determine that the horizontal length of the ROI is longer than the vertical length of the ROI. Also, when there are the two groups having the respective representative aspect ratios 1:1 and 3:2 as described above, the image recognition apparatus 100 may determine that the group having the representative aspect ratio 1:1 has the horizontal length and the vertical length that are equal to each other, and the group having the representative aspect ratio 3:2 has the horizontal length that is longer than the vertical length. Thus, the image recognition apparatus 100 may classify the ROI having the aspect ratio of 1.25 into the group having the representative aspect ratio of 3:2 and the horizontal length longer than the vertical length. For an ROI having a vertical length longer than a horizontal length, the similar principle described above may also be applied to classify the ROI into a corresponding group having a representative aspect ratio closest to an aspect ratio of the ROI. An ROI may be classified into a corresponding group based on an aspect ratio of the ROI, and thus application of an image classifier and a regression operation, which is a subsequent image processing process after the classifying, may be performed independently for each group.

Referring back to FIG. 1, in operation 1300, the image recognition apparatus 100 performs pooling on the ROIs classified into the groups for each of the groups, independently.

As illustrated in FIG. 2, when using groups 1, 2, and 3 to classify the ROIs, the image recognition apparatus 100 may perform pooling on the ROIs included in groups 1, 2, and 3 for each of the groups independently. Referring to FIG. 2, the image recognition apparatus 100 may independently perform pooling on ROI3 and ROI4 included in group 1, ROI2 included in group 2, and ROI3 included in group 3 for each of the groups.

In an example, pooling refers to a process of compressing input data into a maximum value or a mean value through a filter. Herein, the compressing of the input data into a maximum value is also referred to as max pooling, and the compressing of the input data into a mean value is also referred to as average pooling. The pooling may be performed by a pooling layer included in a CNN.

In an example, the image recognition apparatus 100 may set a plurality of divided regions in each of the ROIs to perform the pooling on the ROIs classified into the groups. Herein, a ratio of a number of divided regions set in each of the ROIs in a horizontal direction and a number of divided regions set in each of the ROIs in a vertical direction may be equal to a representative aspect ratio of a group including a corresponding ROI. Herein, by matching the ratio between the number of divided regions in the horizontal direction and the number of the divided regions in the vertical direction to the representative aspect ratio, it is possible to prevent a loss of an aspect ratio information of an ROI.

Figure 3A:
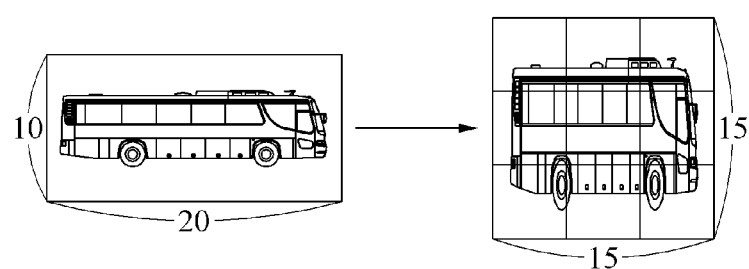
FIG. 3A is a diagram illustrating an example of how divided regions are set using an existing R-CNN.

FIG. 3A is a diagram illustrating an example of how divided regions are set using an existing R-CNN. Referring to FIG. 3A, an image recognition method using an existing R-CNN may set, in an ROI, three divided regions in a horizontal direction and three divided regions in a vertical direction, irrespective of an aspect ratio 2:1 of the ROI. By setting the divided regions in such a way described in the foregoing, the aspect ratio 2:1 of the ROI may be changed to 1:1. The aspect ratio may thus be distorted, and thus a loss of aspect ratio information of the ROI may occur through the existing image recognition method.

Figure 3B:
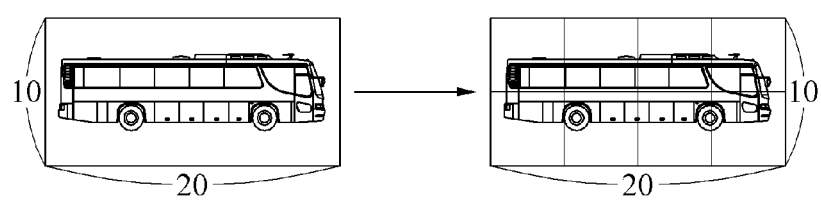
FIGS. 3B through 3D are diagrams illustrating examples of how divided regions are set in an ROI based on a representative aspect ratio of a group including the ROI.
Figure 3C:
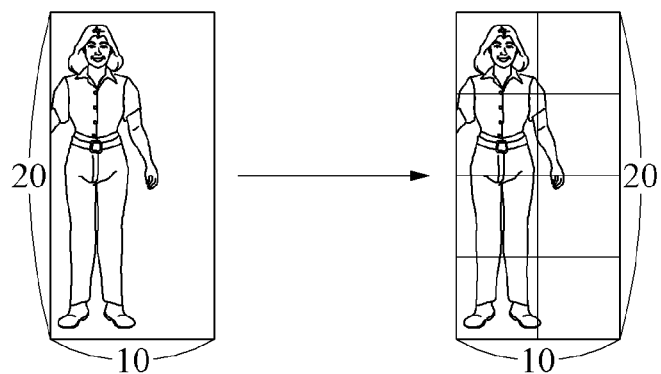
Figure 3D:
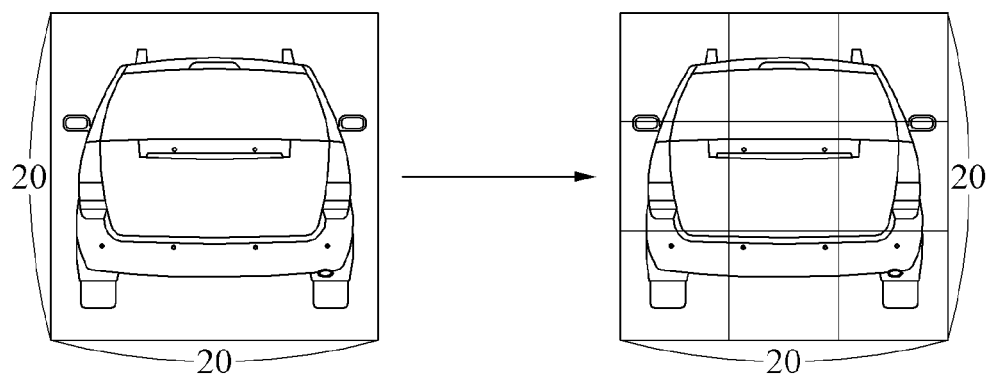

FIGS. 3B through 3D are diagrams illustrating examples of setting divided regions in an ROI based on a representative aspect ratio of a group including the ROI.

Referring to FIGS. 2 and 3B, the aspect ratio of ROI1 is 2:1, and thus ROI1 is included in group 3 having the representative aspect ratio of 2:1. Based on the representative aspect ratio 2:1 of group 3 including ROI1, the image recognition apparatus 100 sets a corresponding number of divided regions, for example, four in a horizontal direction*two in a vertical direction, in ROI1 to maintain the aspect ratio of ROI1. As illustrated in FIG. 3B, a ratio between the number of the divided regions set in ROI1 in the horizontal direction, which is four, and the number of the divided regions set in ROI1 in the vertical direction, which is two, is equal to the representative aspect ratio 2:1 of group 3 including ROI1. Thus, although the divided regions are set in ROI1 included in group 3, aspect ratio information is maintained.

Referring to FIGS. 2 and 3C, the aspect ratio of ROI2 is 1:2, and thus ROI2 is included in group 2 having the representative aspect ratio of 1:2. Based on the representative aspect ratio 1:2 of group 2 including ROI2, the image recognition apparatus 100 sets a corresponding number of divided regions, for example, two in a horizontal direction*four in a vertical direction, in ROI2 to maintain the aspect ratio of ROI2. As illustrated in FIG. 3C, a ratio between the number of the divided regions set in ROI2 in the horizontal direction, which is two, and the number of the divided regions set in ROI2 in the vertical direction, which is four, is equal to the representative aspect ratio 1:2 of group 2 including ROI2. Thus, although the divided regions are set in ROI2 included in group 2, aspect ratio information is maintained.

Referring to FIGS. 2 and 3D, the aspect ratio of ROI3 is 1:1, and thus ROI2 is included in group 1 having the representative aspect ratio of 1:1. Based on the representative aspect ratio 1:1 of group 1 including ROI3, the image recognition apparatus 100 sets a corresponding number of divided regions, for example, three in a horizontal direction*three in a vertical direction, in ROI3 to maintain the aspect ratio of ROI3. As illustrated in FIG. 3D, a ratio between the number of the divided regions set in ROI3 in the horizontal direction, which is three, and the number of the divided regions set in ROI3 in the vertical direction, which is three, is equal to the representative aspect ratio 1:1 of group 1 including ROI3. Thus, although the divided regions are set in ROI3 included in group 1, aspect ratio information is maintained.

In another example, the image recognition apparatus 100 may set divided regions in each of ROIs included in a plurality of groups such that a difference between numbers of the divided regions set in the ROIs is less than a threshold value. For example, the image recognition apparatus 100 may set the divided regions such that the difference in number of divided regions does not exceed the threshold value, for example, 2. In an example, when the difference in number of divided regions is not limited to the threshold value or the like as described in the foregoing, a quality difference may be great in results obtained by performing the pooling independently on each of the groups. However, by limiting the difference in number of divided regions as described above, it is possible to reduce the quality difference although the pooling is performed independently on the ROIs included in each of the groups.

For example, referring to FIGS. 3B through 3D, numbers of divided regions set in the ROIs respectively included in group 1, group 2, and group 3 are 8 (4*2), 8 (2*4), and 9

(3\*3), respectively. In such an example, a difference between the numbers of the divided regions set in ROIs included in group 1 and group 2, respectively, is 0, a difference between the numbers of the divided regions set in ROIs included in group 2 and 3 is 1, and a difference between the numbers of the divided regions set in ROIs included in group 3 and group 1 is 1. When the threshold value is 2, the difference in the number of the divided regions does not exceed 2 even if any two groups among the three groups are compared. Thus, it is possible to uniformly maintain qualities as results of the pooling performed on the ROIs included in group 1, group, 2, and group 3, independently.

Referring back to FIG. 1, in operation 1400, the image recognition apparatus 100 performs a regression operation to a result of the pooling, and applies an image classifier to a result of the regression operation.

In an example, the regression operation, is an analytical method used to observe successive variables, obtain a model between two variables, and measure a fitness for conditions that, for example, 1) residuals have a same variance over all independent variables, 2) an expected (mean) value of the residuals is 0, 3) a probability distribution of collected data is a normal distribution, 4) independent variables are not correlated with each other, and 5) data collected over time is not affected by noise. Regression may be classified into simple regression or multiple regressions based on whether a dependent variable and an independent variable are in a one-to-one relationship or in a one-to-many relationship.

The image recognition apparatus may perform the regression operation on an ROI to compensate for a location of the ROI. The location of the ROI detected through a regression proposal algorithm may not be accurate. In such a case in which the ROI is not accurately detected, it may not be possible to determine an object included in an image from which the ROI is detected. Thus, by the regression operation, the location of the ROI may be more accurately compensated for. For the regression operation, the image recognition apparatus 100 may use one of various algorithms, such as, for example, a linear regression algorithm, a logistic regression algorithm, a polynomial regression algorithm, a stepwise regression algorithm, a ridge regression algorithm, a lasso regression algorithm, and an elastic net regression algorithm. For example, referring to FIG. 3C, ROI2 detected around a human being may not include a portion of a body of the human being, and there may be some error, such as a blank space. Although not illustrated, the image recognition apparatus 100 may compensate for a location of ROI2 by performing the regression operation on the result of the pooling performed in the example illustrated in FIG. 3C.

The image recognition apparatus 100 may recognize an object included in a detected ROI using the image classifier. For example, the image recognition apparatus 100 may apply the image classifier to the result of the pooling using a softmax layer of a CNN. For example, referring to FIG. 3B, the image recognition apparatus 100 may recognize ROI1 as a bus by applying the image classifier to a result of pooling performed on ROI1. Referring to FIG. 3C, the image recognition apparatus 100 may recognize ROI2 as a human being by applying the image classifier to a result of pooling performed on ROI2. Referring to FIG. 3D, the image recognition apparatus 100 may recognize ROI3 as a van or an SUV by applying the image classifier to a result of pooling performed on ROI3.

Figure 4:
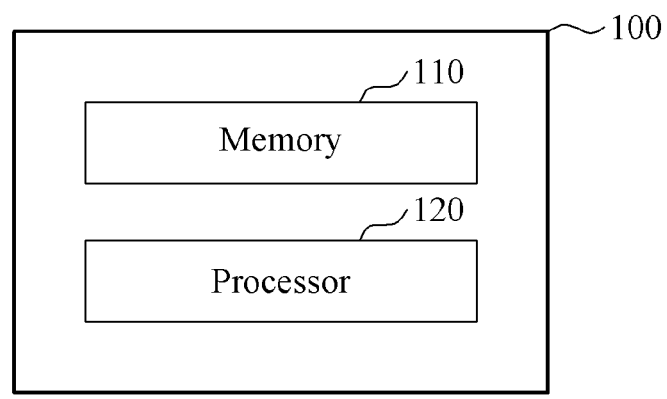
FIG. 4 is a diagram illustrating an example of an image recognition apparatus.

FIG. 4 is a diagram illustrating an example of the image recognition apparatus 100.

Referring to FIG. 4, the image recognition apparatus 100 includes a memory 110 and a processor 120. In the memory 110, a control program may be recorded. The control program may generate a feature map from an input image, detect one or more ROIs in the feature map, classify the ROIs into group based on preset setting information, for example, an aspect ratio of each of the ROIs, independently pool, in each of the groups, the ROIs classified into the groups, apply an image classifier to a result of the pooling, and apply a linear regression model to a result of the applying of the image classifier.

In an example, the processor 120 classifies each of the ROIs into a group having a representative aspect ratio that is most closely approximate to an aspect ratio of a corresponding ROI. For example, referring back to FIG. 2, the processor 120 classifies ROI1 into group 3, ROI2 into group 2, and ROI3 and ROI4 into group 1.

In another example, before performing the pooling on the ROIs included in the groups, the processor 120 may set, in each of the ROIs, a number of divided regions in a horizontal direction and a number of divided regions in a vertical direction such that a ratio between the number of the divided regions in the horizontal direction and the number of the divided regions in the vertical direction is equal to a representative aspect ratio of a group including the corresponding ROI. For example, referring back to FIG. 3B, the processor 120 sets, in ROI1, four divided regions in a horizontal direction and two divided regions in a vertical direction such that the aspect ratio 2:1 of ROI1 is maintained. Referring back to FIG. 3C, the processor 120 sets, in ROI2, two divided regions in a horizontal direction and four divided regions in a vertical direction such that the aspect ratio 1:2 of ROI2 is maintained. Referring back to FIG. 3D, the processor 120 sets, in ROI3, three divided regions in a horizontal direction and three divided regions in a vertical direction such that the aspect ratio 1:1 of ROI3 is maintained.

In still another example, before performing the pooling on the ROIs included in the groups, the processor 120 may set a plurality of divided regions in each of the ROIs classified into the groups. In such an example, a difference between the numbers of the divided regions set for the groups may be less than a threshold value. For example, referring to FIGS. 3B through 3D, the processor 120 sets, in the ROIs respectively included in group 1, group 2, and group 3, eight divided regions, eight divided regions, and nine divided regions, respectively. Herein, a difference between the numbers of the divided regions set in the ROIs included in group 1 and group 2 is 0, a difference between the numbers of the divided regions set in the ROIs included in group 2 and group 3 is 1, and a difference between the numbers of the divided regions set in the ROIs included in group 3 and group 1 is 1. When the threshold value is 2, the difference in the number of the divided regions does not exceed 2, if any two groups among the three groups are compared.

The image recognition apparatus 100, and other apparatuses, units, modules, devices, and other components described herein with respect to FIG. 4 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1, 2, and 3A through 3D that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image recognition method using a region-based convolutional neural network (R-CNN), the image recognition method comprising:
   generating a feature map from an input image;
   detecting one or more regions of interest (ROIs) in the feature map;
   classifying the one or more ROIs into groups based on aspect ratios of the one or more ROIs;
   performing pooling on the one or more ROIs classified into the groups for each of the groups; and
   performing a regression operation on a result of the pooling, and applying an image classifier to a result of the regression operation,
   wherein the classifying comprises:
      classifying an ROI of the one or more ROIs into a group having a representative aspect ratio closest to an aspect ratio of the one or more ROIs.

2. The image recognition method of claim 1, wherein the performing of the pooling comprises:
   setting divided regions in each of the one or more ROIs classified into the groups,
   wherein a ratio between a number of divided regions in an ROI of the one or more ROIs in a horizontal direction and a number of divided regions in the ROI of the one or more ROIs in a vertical direction is equal to a representative aspect ratio of a group comprising the ROI.

3. The image recognition method of claim 1, wherein the performing of the pooling comprises:
   setting divided regions in each of the one or more ROIs classified into the groups,
   wherein a difference between a number of divided region in any two ROI of the one or more ROIs is less than a threshold value.

4. The image recognition method of claim 1, wherein the aspect ratio comprises a ratio between a horizontal length and a vertical length of each of the one or more ROIs.

5. The image recognition method of claim 1, wherein the detecting of the one or more ROIs comprises detecting the one or more ROIs based on performing region proposal.

6. A non-transitory computer-readable storage medium storing instructions that, when executed by a processor, cause the processor to perform the image recognition method of claim 1.

7. An image recognition apparatus comprising:
   a processor configured to:
      generate a feature map from an input image;
      detect one or more regions of interest (ROIs) in the feature map;
      classify the one or more ROIs into groups based on aspect ratios of the one or more ROIs;
      perform pooling on the one or more ROIs classified into the groups for each of the groups; and
      perform a regression operation on a result of the pooling, and apply an image classifier to a result of the regression operation,
   wherein the processor classifying the one or more ROIs is configured to:
      classify an ROI of the one or more ROIs into a group having a representative aspect ratio closest to an aspect ratio of the one or more ROIs.

8. The image recognition apparatus of claim 7, wherein the processor is further configured to:
   set divided regions in each of the one or more ROIs classified into the groups,
   wherein a ratio between a number of divided regions in an ROI of the one or more ROIs in a horizontal direction and a number of divided regions in the ROI of the one or more ROIs in a vertical direction is equal to a representative aspect ratio of a group comprising the ROI.

9. The image recognition apparatus of claim 7, wherein the processor is further configured to:
   set divided regions in each of the one or more ROIs classified into the groups,
   wherein a difference between a number of divided region in any two ROI of the one or more ROIs is less than a threshold value.

* * * * *